United States Patent Office 3,041,143
Patented June 26, 1962

3,041,143
PRODUCTION OF HYDROGEN PEROXIDE
Lynn H. Dawsey, 714 W. 12th St., Tifton, Ga.
No Drawing. Filed June 18, 1959, Ser. No. 821,082
4 Claims. (Cl. 23—207)

A non-exclusive, irrevocable, royalty-free license in the invention herein described for all uses of the United States Government, with power to grant sublicenses for such uses, is hereby granted to the Government of the United States of America.

This invention relates to the production of hydrogen peroxide using alkylated anthraquinones as intermediates. It is a continuation in part of Serial No. 666,211, filed June 17, 1957, now abandoned.

Riedl and Pfleiderer (U.S. Pats. Nos. 2,158,525 and 2,215,883) were the first to disclose, around 1940, a process for the production of hydrogen peroxide wherein an alkylated anthraquinone was hydrogenated in a solvent by means of hydrogen in the presence of a catalyst to the corresponding hydroquinone which, after separation of the catalyst, was oxidized by means of oxygen to produce hydrogen peroxide. The starting anthraquinone was regenerated during the oxidation and the solution was recycled to the hydrogenation stage after first removing the product hydrogen peroxide by aqueous extraction. The alkylated anthraquinones suggested for use as intermediates in such a process were methyl-, ethyl-, and propyl-anthraquinones. The cyclic operation was best accomplished by carrying out both the reduction and autoxidation in a solvent mixture blended so that neither the quinone or hydroquinone forms of the working intermediate separated out at any time during the cycle. Their solvent mixture contained 2 constituents, (1) a hydrocarbon such as benzene to maintain the quinone form of the intermediate in the dissolved state during the oxidation stage of the process and (2) a higher alcohol such as heptanol to keep the hydroquinone form of the intermediate in the dissolved state during the reduction stage of the process. This basic invention was practiced on a semi-commercial scale in Germany during World War II in which instance the work solution consisted of 2-ethylanthraquinone dissolved at a concetnration of 100 g. per liter in a solvent mixture made from equal volumes of benzene and the alcohol. The peroxide production capacity of the organic solution was about 6 g. $H_2O_2$ per liter; the time required for a complete cycle of the work solution through the various pieces of equipment was 2 hours. The highest concentration of aqueous hydrogen peroxide product achieved in practice was a 25% aqueous solution. The installation later blew up, killing four workmen, due to the explosive hazard connected with the use of the volatile solvents.

After 1940, when Riedl and Pfleiderer first proposed making hydrogen peroxide through the cyclic reduction and autoxidation of alkylated anthraquinones, a number of practical improvements were introduced. The volatile benzene component of the work solution was later replaced by the relatively safe naphthalenes (U.S. 2,768,065) which were more efficient than benzene as quinone solvents, while the alcohol component of the work solution was replaced by the nonflammable organic phosphate esters (U.S. 2,537,655) which were superior as hydroquinone solvents. In addition to making the process safer, the use of these solvents afforded a sizeable increase in process capacity, although no improvement was made in strength of the aqueous product manufactured.

By substituting 2-t.-butylanthraquinone for the 2-ethyl-compound in the original Riedl-Pfleiderer invention, Hine-gardner (U.S. 2,689,169) succeeded in raising the capacity of the alcohol-type solution from 6 g. up to about 9.5 g. $H_2O_2$ liter (Example 1, U.S. 2,673,140), a capacity increase of 58%. Also when the butyl-derivative was substituted for the ethyl-compound in a phosphate ester-type work solution, the capacity was raised by about 20%, from 8.5 g. to 10.2 g. $H_2O_2$ per liter of work solution cycled. Thus, the substitution of the butyl-derivative appeared to proportionally improve the capacity of the alcohol-type work solution more than it improved the phosphate ester-type work solution, although some increased capacity was found in both instances.

Heretofore, the known methyl- and propyl-intermediates have been regarded as too insoluble in available organic solvents. Only the ethyl- and t.-butyl-anthraquinones have been worked commercially.

The maximum concentration of hydrogen peroxide attained to date in improved work solutions has been about 10 grams per liter. Even this capacity has been attained only by working a combination of two quinone intermediates at the same time. As pointed out by Sprauer (U.S. 2,673,140), tetrahydro-anthraquinones are usually formed from the parent alkylated anthraquinones during continued operation. A large part of the hydrogen peroxide produced originates from the tetrahydro-alkylated-anthrahydroquinones actually as well as from the parent anthrahydroquinones initially added to the work solutions. Although somewhat higher peroxide capacities have been attainable using a combination of two such related quinones, the total hydroquinone solubility has always been limited. In continuous, practical operation the maximum recoverable peroxide from the work solutions, regardless of intermediate employed, has been only about 9 grams per liter.

The general practice in the prior art has been to hydrogenate the intermediate not much further than 50% of the hydroquinone level so as to suppress the slow conversion of the original alkylated anthraquinone into the less desirable tetrahydroanthraquinone. No material increase in hydroquinone solubility has been observed at hydrogenation levels of 40%, 60%, or 100%. The practice has generally been to load the work solution with the quinone so as to achieve the maximum hydroquinone solubility when at about the 50% hydrogenation level, the objective being to suppress tetrahydroquinone formation by maintaining the presence of an excess of the primary quinone reactant.

The highest strength aqueous product hitherto manufactured directly by any of the anthraquinone autoxidation methods has been a 35% hydrogen peroxide solution (Example 8, U.S. 2,689,169). Although 50% peroxide has for quite some time been the preferred commercial product, because of savings afforded in shipment, all anthraquinone process product has, until now, required concentration through costly vacuum distillation in order to convert to the preferred article of trade.

An object of the present invention is to provide an improved autoxidation process for the direct production of concentrated 50% to 60% aqueous hydrogen peroxide, of high purity, without the need for special vacuum distillation.

An object of this invention is to provide a new organic intermediate, of the alkylanthraquinone class, superior in all respects to any of the intermediates heretofore proposed for production of hydrogen peroxide in autoxidation processes.

The specific gravity of most work solutions employed heretofore has been excessively high, of the order of about 0.975 and very nearly approaching that of the water extractant which is about 1.000; consequently, the extraction of the product has been exceedingly difficult and intricate equipment has been required for this operational step. Therefore, another object of this invention is to provide an alkylanthraquinone intermediate of low specific gravity from which low gravity work solutions may be compounded with realization of vastly improved extraction efficiencies.

Still another object is to provide a simplified work solution in which the necessity for the usual quinone-type solvents like methylnaphthalene or benzene may be eliminated, and in which less expensive solvent materials of a less toxic nature may be substituted.

A further object is to provide a new intermediate of low specific gravity and extraordinary solubility, capable of doubling or tripling hydrogen peroxide producing capacities of the best organic work solutions heretofore known.

Moreover, an object of the invention is to provide an alkylanthraquinone in liquid form, miscible with most of the common organic solvents.

The intermediate of this invention is 2-amylanthraquinone, with the empirical formula $C_{19}H_{18}O_2$ and molecular weight of approximately 278. It may consist entirely of one of the eight theoretically possible isomers, or, it may consist of a mixture of isomers, depending upon the spatial arrangement of the five carbon atoms in the amyl-radical attached to the anthraquinone nucleus. Regardless of isomeric composition, the intermediate, when substantially pure, may be characterized physically as a thermally stable, nonvolatile, pale-yellow substance of low melting point and of consistency about like that of castor oil when liquid, with a specific gravity ranging between 1.01 and 1.15, which sets to a glassy solid upon cooling, and which is insoluble in water, but readily soluble in most of the common organic solvents. The yellow product is not soluble in all proportions with methanol or ethylene glycol, but is much more soluble in ethanol, propanol, etc.; hydrocarbons like mineral oil, kerosene, gasoline, and petroleum ether mix readily; likewise, organic acids, esters, ethers, ketones, amines, and most plasticizers mix easily. The intermediate is completely soluble in concentrated sulfuric acid from which it may be recovered upon dilution with water. It exhibits a broad range of mutual solubility with numerous and diverse solvents, hardly to be expected from a prior knowledge of the properties of other alkylanthraquinones which have been solids and relatively insoluble. Perhaps, the most outstanding physical distinction for amylanthraquinone is that certain forms may exist as a liquid at ordinary temperatures. Alkylanthraquinones known heretofore have been crystalline solids of considerably higher specific gravity than that shown by the intermediate of this invention. Chemically speaking, the intermediate is stable toward oxidizing agents, but changed by reducing agents to the anthrahydroquinone. Upon hydrogenation with active catalyst at elevated temperature, amylanthraquinone can be further reduced to tetrahydroamylanthrahydroquinone as illustrated in the examples which follow. Isolation and purification of the product from organic solutions can be accomplished by vatting with excess sodium dithionite and alkali, filtering off the red aqueous solution to remove foreign matter, and blowing with air. Treatment of amylanthraquinone with oleum at excessive temperatures leads to sulfonation.

When synthesized on a commercial scale, mixtures of the amylanthraquinones may generally be made more economically than the pure individual isomers. Either the purified or the crude intermediate may be utilized for most purposes in making work solutions for the production of hydrogen peroxide by autoxidation methods.

The utility of the intermediate of this invention is based upon discovery of a successful method for synthesizing the 2-amylanthraquinones, but such method is not part of the invention. A synthetic method is given in copending Serial No. 816,676, filed May 29, 1959, which describes 2-amylanthraquinones for the first time.

The intermediate of this invention has been unknown heretofore. In no instance have the preparation or the properties been recorded. Although Peters and Rowe (J. Chem. Soc. 1945, 181–2) successfully applied the customary sulfuric acid cyclisation to the 2-(4'-alkyl-benzoyl)benzoic acids in the synthesis of the corresponding 2-propyl- and 2-butyl-anthraquinones, they failed in all attempts to produce 2-amylanthraquinone or any other alkylanthraquinone wherein the alkyl group contained more than four carbon atoms. The physical existence of only one alkylanthraquinone of molecular weight above that of the butyl-derivative has actually been demonstrated in the past and this particular substance was 2-n.-heptyl-anthraquinone, of melting point 87° C., prepared by a devious and costly method and recorded several decades ago as a scientific curiosity (J.A.C.S. 55, 2815, 1933). The naming of several hypothetical alkylanthraquinones of higher molecular weight has been prompted (Harris, U.S. 2,668,753) by the Peters and Rowe publication, but such hypothetical compounds may be presumed non-existent, especially in the absence of a workable method of synthesis or description of properties.

In accordance with the broad aspects of the present invention, the production of hydrogen peroxide by means of 2-amylanthraquinone proceeds in two main stages: (1) the hydrogenation stage where the quinone form of the intermediate is reduced to the semiquinone form and (2) the oxidation stage where the semiquinone is oxidized back to the quinone with the splitting off of hydrogen peroxide. The first stage may be characterized by the following specific equation:

(1)
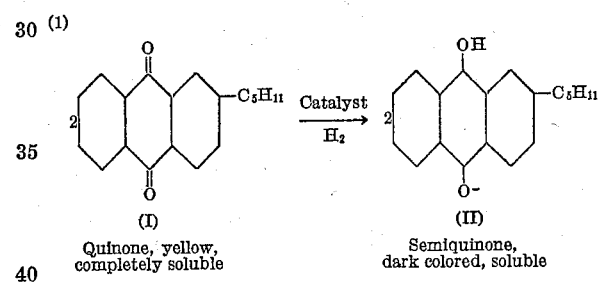

Quinone, yellow, completely soluble

Semiquinone, dark colored, soluble

Hydrogen peroxide is produced by the oxidation of the 2-amylanthrasemiquinone (II) with oxygen in the second stage, as follows:

(2)
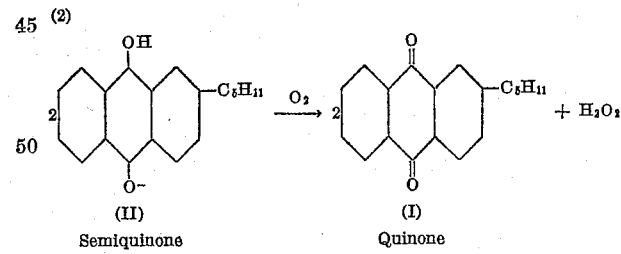

Semiquinone

Quinone

The cycle of the two stages is then repeated after separation of the peroxide from the organic solution as the original 2-amylanthraquinone (I) is regenerated in stage 2.

The reduction of the semiquinone may also be carried beyond stage 1 illustrated above, by partial or complete hydrogenation to the hydroquinone which may be characterized by the equation:

(1a)
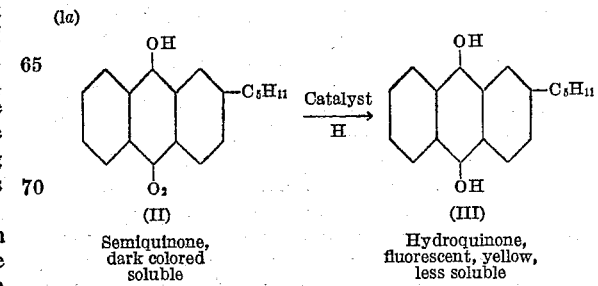

Semiquinone, dark colored soluble

Hydroquinone, fluorescent, yellow, less soluble

The hydroquinone (III) is autoxidizable and hydrogen peroxide may also be produced from it in the second stage, as follows:

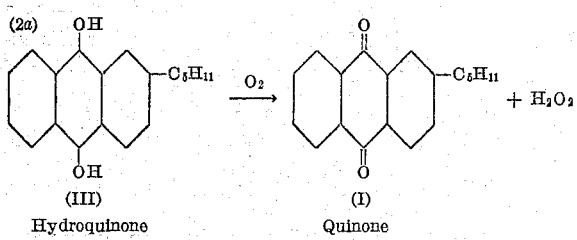

(2a)

(III) Hydroquinone (I) Quinone $+ H_2O_2$ with regeneration of the original quinone (I) in stage 2a and separation of the hydrogen peroxide formed.

The reduced intermediates of this invention may therefore be the 2-amylanthrasemiquinone (II) or the 2-amylanthrahydroquinone (III), or a mixture of these. When hydrogenated beyond the hydroquinone (III) stage, the reduced intermediate of the invention may also partially consist of tetrahydro-2-amylanthrahydroquinone (IV) which is likewise oxidizable in accordance with the Equation 2a above.

The 2-amylanthrasemiquinone (II) is about twice as soluble as the hydroquinone (III) in most organic media. Somewhat different reduction principles have applied heretofore in the hydrogenation of the lower molecular weight alkylated anthraquinones. In the case of the ethyl- and butyl-derivatives, for example, no particular solubility advantages have been noted for the semiquinone forms. In the case of 2-amylanthraquinone, however, the semiquinone shows a decided solubility advantage over the hydroquinone form.

The invention may be practiced with all of the various types of solvents used in the past, but since 2-amylanthraquinone is highly soluble in practically all of the common organic solvents, the need for the special so-called "quinone-type-solvents" in the work solution is eliminated. This high solubility coupled with low specific gravity confers a decided advantage in the use of 2-amylanthraquinone. Higher concentrations of the intermediate can be worked, the peroxide production capacity of the solution can be increased, and the direct extraction of concentrated aqueous product may be attained thereby. The compounding of work solutions with 2-amylanthraquinone intermediate may be accomplished with a single solvent or a combination of several types of solvents. No special quinone type solvent, such as for example benzene, xylene, methyl naphthalene, etc., is necessary, although the latter type may be used for diluent purposes just as other hydrocarbons, like kerosene, might be incorporated in the mixture to adjust some physical property. In the absence of a need for a quinone solvent constituent, the intermediate may be simply blended with one of the so-called "hydroquinone type" solvents. Examples of the latter are methylcyclohexanol and tetradecanol of the alcohol class, or, tributylphosphate and trioctylphosphate in the phosphate ester class, although useful solvents are not necessarily restricted to these classes. Any medium possessing the properties of high semiquinone solvency, mobility, low vapor pressure, chemical stability, water insolubility, etc., may be applicable. It is obvious that diluent solvents may be added for various purposes to the work solution used in the cyclic process.

Some of the following examples illustrate the comparatively high productivity afforded by the new intermediate when used in solution with accepted solvents of the past; other examples illustrate an even higher productivity with newer solvents especially adapted to the working of the particular intermediate:

*Example 1*

A mixture of amylanthraquinones originally derived from cyclisation of a 2-(4'-t.-amylbenzoyl)-benzoic acid of melting point 135°–137° C. was dissolved in hexane, for purification purposes, and filtered at room temperature through a layer of powdered activated alumina. After evaporation of the hexane, the product was a pale yellow viscous oil of specific gravity 1.12, consisting largely of 2-t.-amylanthraquinone. This intermediate was compounded into a work solution initially containing, by volume, 26.8% intermediate, 43.2% refined kerosene of specific gravity 0.82 and distillation range 245°–273° C., and 30% trioctylphosphate. The resulting solution contained 300 grams, or 1.08 mols, per liter intermediate, had a specific gravity of 0.932, and a distribution coefficient of about 45 with 50% aqueous hydrogen peroxide. The distribution coefficient determined was the ratio of peroxide concentration found in the aqueous phase divided by that found in the oil phase after equilibrium was established at 30° C.

The above solution was worked a number of complete cycles which included hydrogenation, oxidation, and extraction of product until part of the anthraquinone intermediate originally added in the work solution had been changed to the tetrahydro-2-amylanthraquinone, as demonstrated by the red color of the solution near the end of the oxidation stage and the longer time required to complete such oxidation. A measured volume of the used solution was then placed in a hydrogenation vessel fitted with an agitator, gas and liquid inlets and outlets, a filter and a meter adapted to measure hydrogen absorption. After addition of catalyst, the solution was hydrogenated at a temperature of 30° C. until 0.54 mol of hydrogen per liter of solution had been taken up, corresponding to 100% conversion of the intermediate from the quinone stage to the semiquinone stage. During such hydrogenation the agitated solution was continuously seeded with a small portion of a suspension of crystals, previously prepared by overhydrogenation of part of the same work solution, in order to induce crystallization before filtration. No crystallization occurred. The reduced solution was filtered from the hydrogenation vessel into an oxidation vessel where it was aerated until the original color was restored. The hydrogen peroxide extracted from the work solution with water amounted to 16.5 grams, or 0.49 mol, per liter of the organic solution. The conversion efficiency of hydrogen to the peroxide was 91% during the cycle. The maximum strength of aqueous hydrogen peroxide extractable at equilibrium from the oxidized work solution, calculated from the determined distribution coefficient, was 59% by weight.

This example illustrates a high work capacity and improved product strength made possible through use of 2-amylanthraquinone intermidate. Comparable working of 2-ethylanthraquinone gave only 8.5 grams of $H_2O_2$ per liter capacity in a similar work solution, with recovery of a 27.5% aqueous product at best (Example II, U.S. 2,768,065).

The next example illustrates, amongst other features, the improved capacity attainable in a typical alcohol type work solution.

*Example 2*

A mixture of amylanthraquinones originally derived from cyclisation of a 2-(4'-sec.-amylbenzoyl)benzoic acid of melting point 106–107° C. was purified, as in Example 1. The oily intermediate of specific gravity 1.07, which consisted largely of 2-sec.-amylanthraquinones, was compounded in a solvent mixture consisting of 60% diisobutylcarbinol and 40% refined kerosene by volume, to give a work solution of 0.875 specific gravity containing 250 grams, or 0.90 mol. of the intermediate per liter. A measured volume of this work solution was run into the hydrogenation vessel, as in Example 1, and hydrogenated at 30° C. after the addition of catalyst, until 0.43 mol of hydrogen per liter of solution had been absorbed, corresponding to 95% conversion of the intermediate from the quinone to the semiquinone stage. No crystallization took place with seeding. The reduced solution was filtered from the hydrogenation vessel into the oxidation vessel, where it was aerated until the original yellow color was restored. The hydrogen peroxide formed was extracted with water and amounted to 13.8 grams, or 0.41 mol, per liter of solution oxidized. The efficiency of conversion of hydrogen to the peroxide was 95%. A small percentage of the original quinone was assumed to have been converted into tetrahydro-2-amylanthraquinones during the cycle.

A previous working of 2-t.-butylanthraquinone (Example 8, Brit. Pat. 686,567) in a similar alcohol type solution of specific gravity 0.93, resulted in production of about 9.5 grams $H_2O_2$ per liter of solution as compared with the 13.8 grams $H_2O_2$ in the above example when amylanthraquinone was utilized as the intermediate. The new intermediate thus permitted, simultaneously, a capacity increase of 46%, and 80% reduction in the specific gravity difference of the work solutions, elimination of 1-methylnaphthalene as a solvent constituent of the work solution, and extraction of an aqueous product of considerably higher concentration.

Example 3

An isomeric mixture of 2-amylanthraquinones derived from cyclization of a commercial mixture of 2-(4'-amylbenzoyl)benzoic acids was purified as in Example 1. This intermediate was a hexane soluble, pale yellow, viscous oil with a specific gravity of 1.07 which was shown by appropriate analysis to consist principally of reducible quinones of molecular weight about 278. It was compounded into a work solution initially containing, by volume, 23.4% intermediate, 46.6% refined kerosene, and 30% trioctylphosphate. The resulting solution contained 250 grams, or 0.90 mol, of intermediate per liter, had a specific gravity of 0.913, and was found to have a hydrogen peroxide distribution coefficient of about 48 with 50% aqueous hydrogen peroxide. A measured volume was run into the hydrogenation vessel, as in Example 1, and after addition of catalyst was hydrogenated at 30° C. until 0.45 mol of hydrogen per liter of solution had been absorbed, corresponding to 100% conversion of the intermediate from the quinone stage into the semiquinone stage. During hydrogenation the agitated solution was progressively seeded with small portions of a suspension of crystals previously prepared by overhydrogenation of part of the same work solution, for the purpose of provoking crystallization, but no crystallization occurred. The reduced solution was filtered off, oxidized, and extracted with water, as in Example 1. The hydrogen peroxide produced amounted to 13.9 grams, or 0.41 mol, per liter of oxidized solution. The efficiency of conversion of hydrogen to peroxide was 91%. The maximum strength of aqueous hydrogen peroxide extractable at equilibrium from this oxidized work solution, calculated from the determined distribution coefficient, was 55% by weight.

This example illustrates, amongst other things, the working of the intermediate when consisting of mixed isomers of 2-amylanthraquinone in a known phosphate ester type solvent with a kerosene diluent.

Example 4

This example illustrates the working 2-amylanthraquinone together with its corresponding tetrahydro-derivative in the solvents of Example 3, and shows further increased production capacity due to working these related intermediates in combination.

The work solution of Example 3 was modified so as to contain 60 grams per liter of the corresponding tetrahydro-2-amylanthraquinones in addition to the 250 gram per liter of 2-amylanthraquinones and the 30% by volume of trioctylphosphate, to give a total compound concentration of 310 grams, or 1.11 mols, per liter in the modified solution. The tetrahydro-2-amylanthraquinone, which was a solid material of melting point 103–105° C. was added at the expense of the kerosene diluent, of course.

The resulting solution had a specific gravity of 0.924 and a distribution coefficient of 45 against 50% aqueous hydrogen peroxide. It was hydrogenated as in Example 3 with an uptake of 0.55 mol of hydrogen per liter of solution, the catalyst was filtered off, and the solution was oxidized and extracted with water with a recovery of 17.0 grams or 0.50 mol of hydrogen peroxide per liter of solution worked. The maximum strength of aqueous hydrogen peroxide extractable at equilibrium from this oxidized work solution, calculated from the distribution coefficient, was 61%.

The production capacity increase between Examples 3 and 4 amounted to a 22% improvement, and was made possible by working both the parent and tetrahydro-intermediates in combination. Heretofore, no such advantage has been demonstrated for the 2-ethylanthraquinones and 2-butylanthraquinones, and their corresponding tetrahydro-derivatives, when worked in combination.

The foregoing examples compare the several advantages of 2-amylanthraquinone intermediate with known intermediates when used in conjunction with known solvents of the prior art. They demonstrate the outstanding superiority of 2-amylanthraquinone over any of the intermediates heretofore proposed for the production of hydrogen peroxide by autoxidation processes.

Higher concentrations than those illustrated above may be worked with the intermediate of this invention, since it is widely soluble in most organic solvents without overstepping the usual specific gravity limitations encountered heretofore in such work solutions. Thus, when it is desired to extract the customary 25% to 30% aqueous product of the prior art, the intermediate may easily be compounded into organic work solutions of capacity of 20 grams per liter of hydrogen peroxide, and higher. Also, special solvents adapted particularly to mixing with the new intermediate permit a doubled or tripled capacity and counter-current extraction of a 50% or 60% product at the same time. The next two examples illustrate the performance of the intermediate when used in conjunction with a ketone type solvent especially suited to the peculiar properties of this intermediate.

Example 5

A liquid isomeric mixture of 2-sec.-amylanthraquinones of specific gravity 1.12 was blended with a commercial grade of 2,6,8-trimethyl-4-nonanone of specific gravity 0.818 to give a concentration of 350 grams, or 1.26 mols, of the intermediate per liter of mixture. The resulting solution then tested a specific gravity of 0.910, a viscosity of 3.9 centipoises at 35° C., a freezing point below 0° C., and a distribution coefficient against 50% aqueous hydrogen peroxide of 58 while that against 70% hydrogen peroxide was 42. A measured volume was run into the hydrogenation vessel, as in Example 1, and after addition of catalyst was hydrogenated at 35° C. until 0.64 mol of hydrogen was absorbed per liter of solution, corresponding to 100% conversion of the intermediate to the semiquinone stage. The reduced solution was filtered off, oxidized with air, and extracted with water, with recovery of 0.59 mol or 20.0 grams of hydrogen peroxide per liter of organic solution worked. The conversion efficiency of hydrogen to recovered peroxide was 92%. The maximum strength of aqueous hydrogen peroxide extractable at equilibrium from this oxidized work solution, calculated from the distribution coefficient, was 68% by weight.

Although a concentration of 350 grams per liter was worked through the semiquinone reduction stage of the cycle, the 2-amylanthraquinone in the above example was actually miscible in all proportions with the solvent used. Comparable quinone solubilities for the 2-ethylanthraquinone and the 2-t.-butylanthraquinone, of the prior art in the same ketone solvent, were found to be only 40 grams and 90 grams per liter of solution, respectively, which figures represent the maximum workable concentrations of these older intermediates with this solvent. Such wide differences further illustrate the outstanding solubility of 2-amylanthraquinone as an organic intermediate.

The next example illustrates advantages gained in working both 2-amylanthraquinone and its tetrahydro-derivative in combination in the same solution.

*Example 6*

This modified work solution was the same as the one employed in Example 5, with the exception that it contained 150 grams of tetrahydro-2-amylanthraquinone per liter in addition to the 350 grams per liter of the parent 2-amylanthraquinone. The total compounds concentration was 500 grams, or 1.8 mols, per liter. The tetrahydro-derivative which was a solid material prepared beforehand, was added at the expense of the ketone solvent, of course. This modified solution tested a specific gravity of 0.960, a viscosity of 7.6 centipoises at 35° C., a crystallization point of 28° C. where the tetrahydroderivative began to separate, and gave distribution coefficients against aqueous hydrogen peroxide which were substantially the same as those cited for the work solution of Example 5. A measured volume was added to the hydrogenator, as in Example 1, and after the addition of catalyst, the solution was reduced at 35° C. until 0.90 mol of hydrogen was absorbed per liter of solution, corresponding to 50% conversion of total quinones present to the hydroquinone stage. The reduced solution was then filtered off, oxidized with air, and extracted with water with a recovery of 0.81 mol, or 27.5 grams, of hydrogen peroxide per liter of organic solution worked. The conversion efficiency of hydrogen to recovered peroxide was 90%. The maximum strength of aqueous peroxide calculated as producible at equilibrium by extraction with water was 80% by weight, although lower concentrations were actually made due to the known hazardous nature of hydrogen peroxide in concentrations above about 60% strength.

In carrying out the reduction in the present invention any suitable hydrogenation catalyst may be employed. Various catalysts have been proposed for hydrogenating alkylated anthraquinones, including Raney nickel and alumina-supported palladium (U.S. 2,689,169), and either of these may be employed. The use of such catalysts in continuous hydrogenation of the alkylated anthraquinone of the past is known to cause a slow conversion of the parent intermediate into tetrahydroanthraquinones, which eventually build up to a steady state. To some degree this is also true in the case of the present intermediate, but the higher concentration of primary reactant recommended in the practice of the present invention together with the limitation of reduction to the semiquinone stage, tends to minimize the formation of tetrahydro-2-amylanthraquinones in most work solutions. If present in the reduction-oxidation cycle the tetrahydro-2-amylanthraquinones also produce hydrogen peroxide, as is illustrated in some of the foregoing examples.

Temperatures and pressures previously suggested for processes of this type may be used. Hydrogenation may be carried out at 30° to 50° C., at pressures of 0.5 to 3.0 atmospheres, and oxidation may be conducted with air or oxygen within the range of 30° to 60° C. However, temperatures outside these ranges may also be used.

Separation and recovery of the hydrogen peroxide product from the work solutions of this invention may be accomplished by distillation or freezing methods, in addition to the extraction method illustrated. Because of the low freezing points of most work solutions made with the present intremediate, separation of hydrogen peroxide may also be accomplished by a combination of methods including both extraction and freezing.

From the foregoing it will be seen that the present invention provides an intermediate of great practical value in the manufacture of hydrogen peroxide according to autoxidation processes.

I claim:

1. A cyclic process for the manufacture of hydrogen peroxide in high concentration which comprises reducing amylanthraquinone to a corresponding reduced form in a work solution consisting essentially of liquid amylanthraquinone and a single-constituent organic solvent for said reduced form, the concentration of the amylanthraqinone in said work solution being between about 0.9 and 2.0 mols per liter, thereafter oxidizing said reduced form to regenerate the amylanthraquinone and to produce hydrogen peroxide, and recovering the hydrogen peroxide from said work solution.

2. A cyclic process as set forth in claim 1 in which said work solution contains a mixture of liquid amylanthraquinones.

3. A cyclic process as set forth in claim 1 in which the reduction of the amylanthraquinone is so controlled that it is reduced substantially to its semiquinone stage.

4. A cyclic process for the manufacture of hydrogen peroxide in high concentration which comprises reducing a mixture of amylanthraquinone and its corresponding tetrahydro-amylanthraquinone to their corresponding reduced forms in a work solution consisting essentially of liquid amylanthraquinone, its corresponding tetrahydroamylanthraquinone and a single-constituent organic solvent for said reduced forms, the concentration of said quinones in said work solution being between about 0.9 and 2.0 mols per liter, thereafter oxidizing said reduced forms to regenerate the amylanthraquinone and its corresponding tetrahydro-amylanthraquinone and to produce hydrogen peroxide, and recovering said hydrogen peroxide from said work solution.

References Cited in the file of this patent

UNITED STATES PATENTS

| | | |
|---|---|---|
| 2,657,980 | Sprauer | Nov. 3, 1953 |
| 2,668,753 | Harris et al. | Feb. 9, 1954 |